WARREN W. BEGLEY,
ROBERT E. WILCOX,
EUGENE A. HOSKINSON,
INVENTORS.

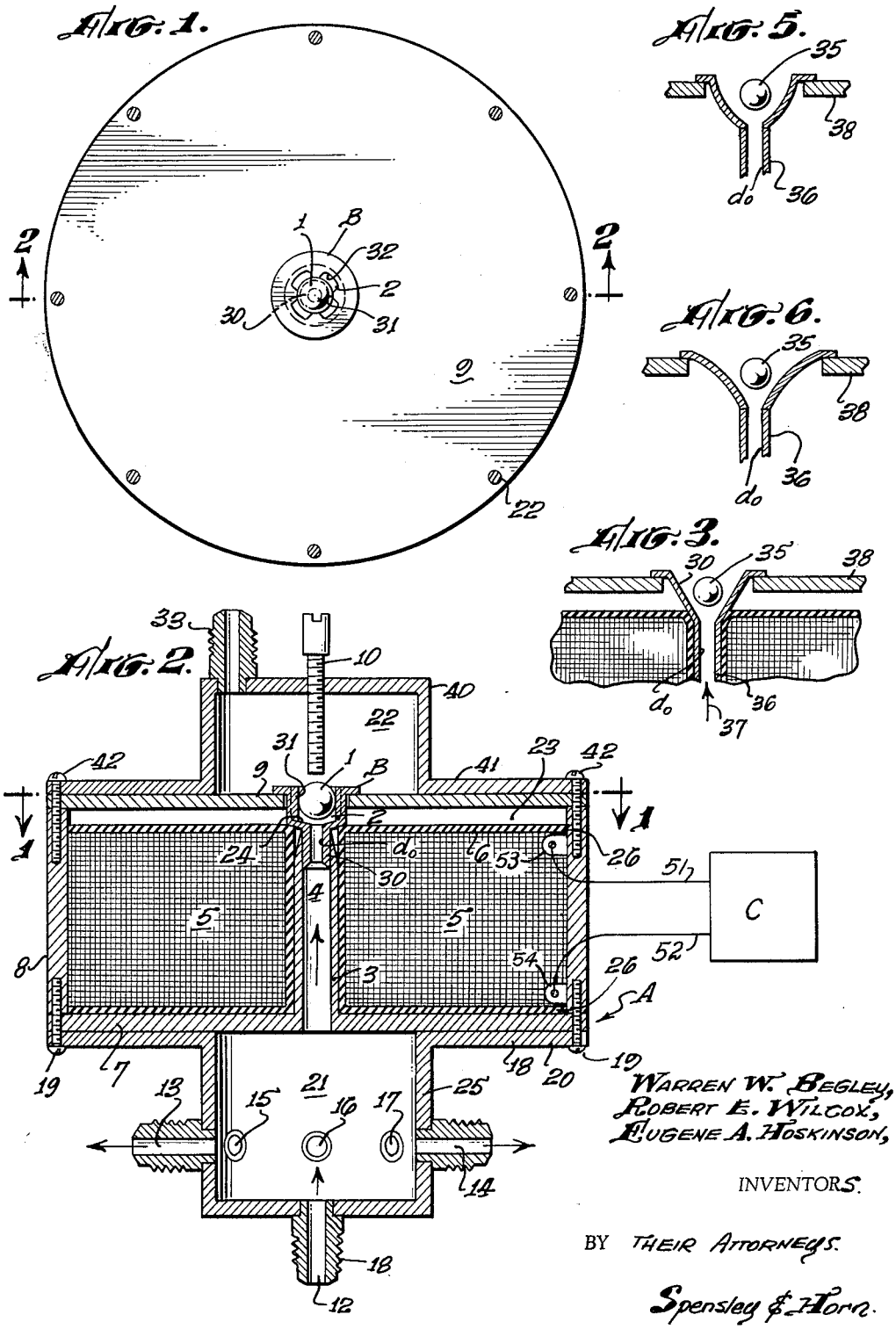

BY THEIR ATTORNEYS.

Spensley & Horn 3,225,782
FLUID CONTROL SYSTEM
Warren W. Begley, 14900 Hiawatha St., Mission Hills, Calif.; Robert E. Wilcox, 12436 Landale St., North Hollywood, Calif.; and Eugene A. Hoskinson, 9722 Rangeview Drive, Santa Ana, Calif.
Filed Apr. 5, 1963, Ser. No. 270,972
4 Claims. (Cl. 137—115)

This invention relates to electrically operated valves and more particularly to a fluid valve having means for regulating the fluid flow or fluid pressure at the outlet side of the valve by providing a predetermined impedance through the valve. This application is a continuation-in-part of copending application Serial No. 38,189 filed June 23, 1960 by Warren W. Begley, Robert E. Wilcox and Eugene A. Hoskinson for Electromagnetic Valve, now abandoned.

In the prior art, many electrically operated valves are known in which a coil or magnet is energized to seat or release a plunger for off-on operation. Electrically actuated valves are also well known to provide a fixed pressure differential or bias through the cavity of the valve. In many fluid applications, however, there is a need to provide some system by means of which outlet pressure or flow rate from a valve can be held constant or varied in a predetermined manner when the inlet pressure or flow rate to the valve varies. Other applications require a valve by means of which the output pressure can be varied when the inlet pressure is constant.

Accordingly, it is an object of the present invention to provide an improved electrically actuated fluid valve in which impedance through the valve can be predetermined and varied.

It is another object of the present invention to provide a fluid flow valve by means of which the pressure or flow rate at the outlet side of the valve can be controlled or regulated as a function of the inlet flow rate to the valve.

A further object of the present invention is to provide a fluid flow valve in which the impedance to fluid flow through the valve is a function of the magnitude of electric current actuating the valve.

It is another object of the present invention to provide an electromagnetic fluid flow valve in which the control parameters of the valve can be selected as a function of the pressure at the inlet or outlet side of the valve.

Yet another object of the present invention is to provide a fluid flow valve of the type described which is simple in construction and efficient in operation.

In its presently preferred embodiment, the present invention comprises a novel valve assembly including a control valve portion in accordance with the present invention. The valve assembly is adapted to provide fluid pressure at the outlet side of the valve assembly in a fluid system, which pressure is proportional to or a function of the magnitude of an electrical parameter impressed upon the valve assembly for the control thereof. The control valve portion of the valve assembly utilizes a paramagnetic sphere disposed and movable within a flared throat in a fluid passage to give proportional control of the fluid pressure drop through the control valve according to the current employed in a solenoid positioned to magnetically attract the sphere to various positions along the longitudinal axis of the throat to hereby provide an annular passage of varying area. The attracting force is provided against the direction of the flow of fluid. During operation of the valve, with fluid flowing therethrough, the ball does not seat but remains in an equilibrium condition at the position predetermined by the magnetic force impressed upon the sphere. Mechanical means are preferably employed to restrict the motion of the sphere away from the magnetic structure so that it will not pass beyond the influence of the magnetic force. The efficiency of the solenoid in exercising magnetic attraction upon the sphere is enhanced by a reentrant paramagnetic cylindrical structure. This structure surrounds the solenoid and has an annular gap adjacent to the sphere.

By altering the flare or curvature of the throat, it is possible to obtain various functions of pressure drop through the control valve relative to the electric current passed through the solenoid. When a conically shaped throat is utilized, the pressure drop is substantially linearly proportional to the current. With a throat shaped as a concave upwardly curved surface, the pressure decreases more rapidly with decrease of current, that is, as the sphere is moved from the narrow portion of the throat. With a convex upwardly shape of the throat, the pressure decreases more slowly with decrease of current.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIGURE 1 is a sectional view in elevation taken along the center line of a presently preferred embodiment of a valve assembly in accordance with the present invention;

FIGURE 2 is a plan view taken along line 2—2 of FIGURE 1;

FIGURE 3 is a partial view in section and enlarged to show the relationship of the sphere and fluid passage in the control valve portion of the valve assembly;

FIGURE 5 is a partial view similar to FIGURE 3 showing an alternative illustrative embodiment of the control valve throat;

FIGURE 6 is a view similar to FIGURE 5 showing a second alternative embodiment of a control valve throat in accordance with the present invention.

Figure 4:
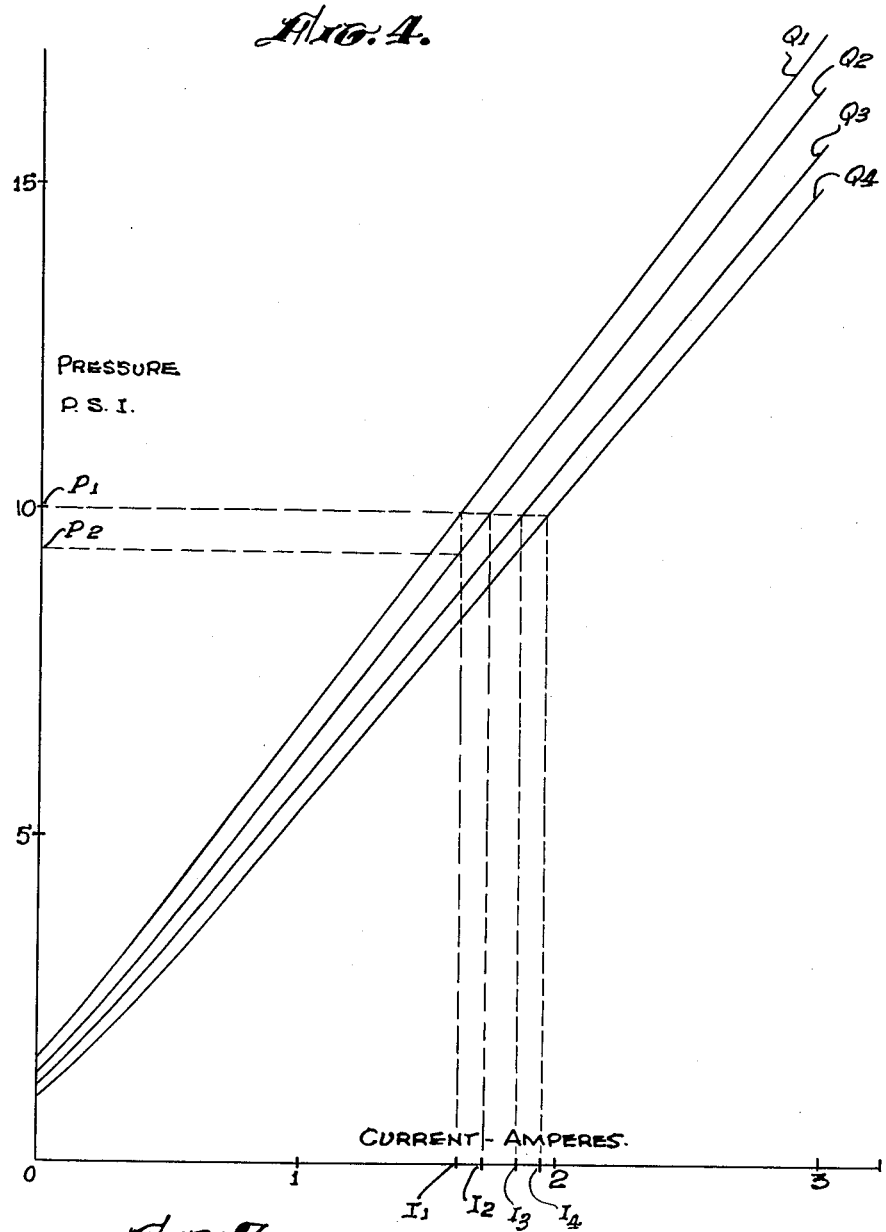
FIGURE 4 is a family of performance curves of the valve assembly as shown in FIGURE 1.

Although not limited thereto, the utility and operation of the present invention can be described in connection with a system wherein it is desired to supply fluid at predetermined pressure to a point in the system regardless of the variation in pressure or flow rate of fluid to the valve from the source of the fluid. For example, an illustrative use of a valve assembly in accordance with the present invention would be a fuel valve in a fuel injection system for an internal combustion engine. In this instance, the valve assembly would be in the nature of a fuel regulating valve and would be utilized to determine the fuel pressure at the injection nozzles to the cylinders of the engine. Accordingly, in the following description, the valve assembly is termed the valve assembly or the regulating valve A while the control valve portion of the valve assembly is referred to as the control valve B. The control valve is located in a bypass fluid passage from a fluid cavity of the regulating valve. It will be apparent to one skilled in the art from the following description that various modifications and re-arrangement of parts can be made within the concept of the present invention. Particularly, the control valve portion can be used in various ways other than by being positioned in a bypass line. Thus, referring now to the drawings, in FIGURE 7 there is shown an exemplary flow diagram illustrating a typical system wherein the present invention valve is usable for the regulation of a fluid flow. Fluid contained in a reservoir is to be ejected from a nozzle at a regulated flow rate. Hence a pump is utilized to withdraw fluid from the reservoir and supply it under pressure to the nozzle. To regulate the flow rate of fluid from the nozzle, a regulating valve A is connected between the nozzle and the reservoir, the valve being responsive to variations in pump output pressure to thereby control the flow rate of fluid through the nozzle.

In FIGURES 1 and 2 of the drawing there are shown various views of the valve A in its presently preferred embodiment. Fluid from the pump is delivered under pressure to a fluid inlet 12 of the regulating valve A. The fluid passes through the inlet 12 into an inlet chamber or fluid cavity 21 and flows from the regulating valve through multiple outlets, outlets 13–17 being visible in FIGURE 2. The control valve section B provides a bypass path with an inlet 4 through which fluid flows from the fluid inlet chamber 21 at a controlled rate as described more fully hereinafter.

Referring now particularly to FIGURE 2, in its presently preferred embodiment the valve A includes a housing 20 which defines the fluid inlet chamber 21, a bypass chamber 22 and a cylindrical section 23 which constitutes the housing for the solenoid control valve portion B of the valve assembly. The housing thus defines three coextensive cylindrical sections and is formed of suitable material such as cold rolled steel. The fluid inlet cavity is thus a closed cylinder with an inlet opening through the lower wall thereof which opening constitutes the fluid inlet 12 to the fluid cavity 21. Suitable connections such as a threaded union 18 are provided for attaching fluid lines to the fluid inlet opening. A plurality of radially spaced fluid outlet openings are provided through the cylindrical wall 25 defining the fluid inlet cavity, eight outlets being provided in the preferred embodiment, although only five of them 13–17 can be seen in the drawing. Each of the outlets is provided with a suitable union. The cylindrical section 23 of the valve housing is substantially greater in diameter than the inlet cavity and bypass cavity portions and contains the solenoid coil 5. In practice, the solenoid is wound on an insulating bobbin 26 for ease of fabrication and assembly. Rexolite or Epon glass have been found to be suitable materials for the bobbin. The number of turns of wire composing the coil depends upon the magnetomotive force required and the reluctance of the magnetic turns. Two thousand turns of #22 AWG wire is utilized in the presently preferred embodiment. A maximum current of three amperes has been possible with this coil and the usual operating current range has been from substantially zero to approximately 1 ampere.

The magnetic structure is further composed of a bottom disc 7 and an outer cylinder 8 in addition to a tubular member 3 forming the bypass passage from the fluid cavity 21. These magnetic parts may be turned from one piece of cold rolled steel in the shape of a cup with an inner tubular member 3, or similar material may be fabricated into this shape by fastening the various portions together as with screws 19 as shown in FIGURE 1. At the upper end, the tubular member 3 is tapered on its external surface to reduce the wall thickness at the upper extremity which forms the inlet 4. This has been found to be desirable in order to concentrate the magnetic flux. A ferrous metal disc 9 is positioned adjacent the open upper end of the cylindrical housing wall 8 and is attached thereto by a plurality of machine screws in order to allow insertion of a solenoid coil into the assembly. Two external leads are required to connect the solenoid coil to an external electrical circuit. As shown in FIGURES 1 and 2, the paramagnetic sphere 1 is positioned within a throat member, the interior surface of which is shaped to form the necessary throat configuration. Thus, as shown particularly in FIGURE 1, the throat member includes a cylindrical portion 30, communicating with the inlet 4 and an upper cylindrical portion 31 having an inside diameter substantially equal to the diameter of the sphere 1 but with a plurality of indentations 32 which form bypass passages past the sphere 1. That is, the diameter of the upper cylindrical portion is such that the sphere is guided along a longitudinal path by the inside diameter of the cylinder but that major portion of the cylinder is greater in diameter to provide a fluid passage 2. The throat surface 24 connects the interior surface of the lower cylindrical portion and the interior surface of the upper cylindrical portion.

It has been found that the configuration of the magnetic structure in the vicinity of sphere 1 is important, particularly in that the magnetic structure must be such that the magnetic forces exerting a radial force on the sphere relative to the longitudinal axis through the bypass inlet passage 4 must not be sufficient to prevent the free longitudinal movement of the sphere in response to magnetic force changes. Accordingly, the throat member is formed of non-magnetic material and the minimization of radial forces is taken care of in the embodiment shown by forming the opening in the disc 9 of sufficient diameter and retaining the sphere 1 always within the confines of the throat member by means of a non-magnetic stop 10 of brass, for example, to limit the maximum excursion of the sphere away from the upper end of the cylindrical portion 30.

A bypass chamber 22 is formed and attached as a part of the valve assembly in a manner similar to the inlet fluid cavity as previously described. The bypass chamber 22 is defined by a cup-shaped housing 40. The housing 40 is provided with a lower flange 41 for fastening by a plurality of screws 42 to threads in the upper part of the magnetic cylinder 8. These same screws also fasten disc 9 in place, as shown in FIGURE 2. The stop 10 is threaded into the uppermost wall of the housing 40, in a longitudinal orientation.

In operation of the valve assembly as a regulating valve in the illustrative embodiment and application, it will be understood that the incoming fluid enters the fluid cavity 21 at the inlet 12. A portion passes through inlet 4, past the tubular member 3 and the sphere 1, into chamber 22 and through an outlet 33 in the uppermost wall of the housing 40. The remainder of the fluid passes out of the several ports 13–17 at a pressure accurately regulated by the position of sphere 1 with respect to the geometry of the bypass passage 2. The position of the sphere, in turn, is regulated by the electric current through solenoid 5. This may be termed the "bypass operation." The portion of the fluid that flows past the sphere 1 is returned via outlet 33 to the input side of the pump for the system.

In order to clarify the operation and utility of the present invention, it is preferable to consider it in connection with a fluid system which contains the valve assembly. Accordingly, in FIGURE 2, a source of fluid, such as a pump (not shown) would deliver fluid into the fluid cavity 21. From the cavity 21, it is desired to conduct fluid through the outlet ports 13 through 17 to a plurality of system outlets such as nozzles in a fuel supply system. If, for example, it is essential that the rate of flow to each nozzle, which would correspond to the rate of flow or pressure at the outlets 13 to 17, be maintained constant it can be so maintained by varying the impedance of the control valve to vary the quantity of fluid allowed to pass through the bypass inlet 4 and from the valve assembly at 33.

The pressure-current relation of a typical valve assembly, of the type shown in FIGURE 2, is given in FIGURE 4. The different curves shown are for different discharge rates designated $Q_1$, $Q_2$, $Q_3$ and $Q_4$ of the pump employed to operate the hydraulic system. $Q_1$ is the greatest discharge rate and $Q_4$ is the least discharge rate. A greater discharge rate from the pump results in a greater pressure in the fluid cavity 21 for a given solenoidal current. The ordinate is pressure, in pounds per square inch, of the fluid in inlet cavity 21, and the abscissa is electric current, in amperes, flowing in solenoid 5. It can be seen that the pressure in the fluid cavity 21 corresponds to the inlet pressure at the control valve orifice $d_o$ and the outlet pressure at the outlets 13-17. Attention is directed to the linearity of these curves. In passing, it is to be noted that the positive intercept on the ordinate axis is caused by gravity and residual magnetism exercising a downward pull on ball 1. If gravity were absent, the intercept would be zero. If the valve assembly is inverted, gravity causes the intercept to be negative. The valve assembly may be operated under any of these conditions, but the position shown, with the discharge out of the top, is normally preferred.

Accordingly, the control valve of the present invention as a part of the metering valve can be utilized to regulate the pressure of the fluid in the fluid cavity 21 to vary the pressure at the outlets 13-17 in a predetermined manner or to maintain such pressures constant when the fluid supplied to the metering valve varies in flow rate or pressure. That is, with a source of fluid to the inlet 12 at a constant pressure, the pressure at the outlets from the metering valve can be varied in a predetermined manner or held constant at a lesser pressure than the inlet pressure. Conversely, if the fluid supply varies in flow rate, the flow rate from the metering valve can be held constant and accurately regulated. For example, referring to FIGURES 2 and 4 in the described embodiment, if the flow rate from the fluid source or pump varies from the flow rate curve labeled $Q_1$ to the flow rate curve $Q_2$, the same pressure ($P_1$, for example) can be maintained in the fluid cavity 21 and thus in the outlet lines by changing the current flowing in the solenoid coil 5 from the value $I_1$ to the greater value $I_2$, thus moving the sphere 1 toward the control valve throat 24 and causing the impedance of the control valve to be raised. It can be seen that if the flow rate decreased from $Q_1$ to $Q_2$, and no change in current flow to the coil was made, the pressure at the outlets would drop from $P_1$ to the value $P_2$.

It is important to note that the control valve is not of the "open and closed" type. Consequently, a carefully ground seat in passage 2 is not required. Nominally clean machining practice is recommended but is not essential to the operation of the invention. Accordingly, the regulating valve is relatively inexpensive to manufacture and it has long operating life.

Figure 7:
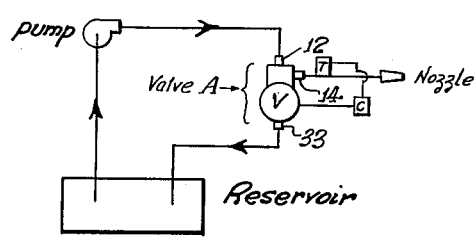
FIGURE 7 is a schematic view of a valve assembly in accordance with the present invention utilized in a fluid circuit for illustrative purposes.

To summarize the operation of the valve, an application in which it is desired to obtain constant pressure in an outlet line 14 from the valve regardless of fluid pressure at the inlet is the most simple illustration of utility. Thus, assuming a hydraulic pump or other source of fluid connected to the fluid inlet 12 of the valve, which pump varies in delivery rate to inlet 12, it is desired to maintain a constant pressure in outlet line 14. Such a system is shown schematically in FIGURE 7 with the connections to the metering valve corresponding to FIGURE 1 of the drawings. The line extending from control outlet 33 acts as a bypass line to return fluid to a reservoir from which fluid is supplied by the pump through the valve to the outlet line 14. Then if the pump operates between flow rates $Q_1$ to $Q_4$ which are sufficient to produce pressures $P_1$ to $P_4$ within the cavity greater than the outlet pressure desired, the desired outlet pressure from outlet 14 is obtained by substantially instantaneous operation of the control valve position of the metering valve to increase or decrease the bypass volume necessary to obtain the required pressure drop. Thus, referring to FIGURE 4, it is desired to maintain a pressure of 10 p.s.i. from outlet 14 with the pump shown as illustrated by the flow rate curves. At the highest flow rate $Q_1$, the current required in the coil would be $I_1$, when the flow rate decreased to $Q_2$, greater current $I_2$ would be required since it would be necessary to diminish the passage through the throat and increase the impedance to fluid flow through the control valve to maintain the outlet pressure. Similarly, if the flow rate decreases to $Q_3$, the current must be increased to $I_3$ and if decreased to $Q_4$, the current is increased to $I_4$. If a pressure to electrical current transducer T, see FIG. 7, is placed in the outlet line as a sensor and set for a pressure of 10 p.s.i. the outlet pressure can then be automatically regulated and controlled without regard to the actual value of current required. Thus, at 10 p.s.i., the sensor will be transmitting a current of value $I_1$, to the coil when the flow rate is $Q_1$. If the flow rate decreases and would thus without regulation cause the outlet pressure to drop, the sensor will detect the pressure drop and transmit an increased current to the coil until equilibrium is established by urging the magnetic ball inwardly to constrict the throat and present greater impedance to the flow of fluid through the bypass line. Thus, the sensor element need only transmit less current to the coil when the pressure in the outlet is rising above the predetermined point and transmit more current when the pressure in the line is falling below the predetermined point. Such transducers to be used as sensors are, of course, well known to the art.

The current to the coil may be varied manually or automatically. As an example of manual control, a battery may be connected through a rheostat to the coil. Many forms of automatic control are also possible. As stated herein above a pressure sensor may be used. The pressure sensor may be connected in a bridge network to provide a nulling servo-mechanism control as is well known in the instrumentation and measurement art.

The operation of the valve of the present invention can be utilized in many other ways. For example, if a source of fluid is utilized which supplied a constant rate of flow to the valve at inlet 12, the outlet pressure can be varied by varying the current to the coil. Thus, again in FIGURE 4, if the source of fluid has a flow rate $Q_1$, the outlet pressure of the valve can be selected and regulated by determining the current required. If the pressure desired is 10 p.s.i., a current of approximately 1.6 amps. in the illustrative embodiment is supplied to the coil. If it is desired to raise the pressure to 15 p.s.i., the current is raised to 2.6 amps. and so forth. Accordingly, with a given rate of flow to the inlet of the metering valve, the outlet pressure from the metering valve can be predetermined and controlled by regulating the current to the coil to predetermined values.

The matter of ball travel as a function of pressure regulation has been investigated and it has been found that when the flare of the throat, at 24 in FIGURE 2, is large, as shown, the travel of the ball in performing the metering function is a small distance as is desirable. For example, with the ball shown and the flare also as shown, of the order of 80° to 90°, the travel for the range of pressure shown in FIGURE 4 was of the order of one-eighth inch. The angle mentioned is measured from the axis of the throat to the surface of the flare or conical shape. If this angle is of the order of 55°, the ball travel is a minimum, and may be only a relatively few thousandths of an inch. Although such a small travel might be desirable in certain embodiments, it has been found that the general application performance is superior if the ball travels a nominal amount, such as the one-eighth inch mentioned.

Consonant with the above-recited findings, a desirable alternate embodiment of the control valve is illustrated in FIGURE 3. The general construction of the control valve follows the embodiment shown in FIGURES 1 and 2. The important differences reside in the different configuration of the throat 30. This is shown in a 30° conical angle. The ball or sphere 35 floats in this conical space, being urged upward by the fluid entering tube 36 in the direction of arrow 37. It is retained in an equilibrium position by magnetic attraction. The attraction occurs, as before, because of the otherwise complete magnetic structure, starting with the top of tube 36 and ending with ferromagnetic disc 38. The structure is proportioned so that the ball is always closer in its operating range to tube 36, rather than to disc 38. Accordingly, the ball remains centrally located and a mechanical stop such as previously described need not be employed. Conversely, if this criterion is violated, we have found that the ball "climbs up the side of the conical surface," seeking to come as close as possible to disc 38. From the investigation previously mentioned, it will be appreciated that the angle of 30° shown may be decreased to 20° and even less to obtain more ball travel with change in metering pressure in the inlet chamber.

The shape of the curves of FIGURE 4 can be altered by altering the shape of the throat. When the shape is of a concave upwards configuration, as shown in FIGURE 5, the passage of fluid for downward motion of the ball in the throat is reduced less rapidly than when the throat is of conical shape. The curves then have a concave downward or saturation shape with pressure at the inlet plotted as a function of solenoid current. For the opposite situation, when the throat is of concave downwards configuration, as shown in FIGURE 6, the passage of fluid for downward motion of the ball in the throat is reduced more rapidly than where the throat is of conical shape and so the curves have a concave upwards or exponential shape.

Thus far, the structure of the control valve of the present invention has been presented as embodied for practical applications.

The mathematical expressions for the general case of metering valve performance according to the present invention and the final expressions are presented below. These may be employed to evolve other embodiments that differ considerably in performance from the specific examples heretofore presented.

Four equations are of interest. The terms are defined as follows:

$P_o$ = orifice pressure, pounds per square inch, where $d_o$ indicates the orifice in FIGURES 2, 3, 5 and 6.
$w$ = specific weight of fuel, pounds per cubic foot.
$g$ = acceleration due to gravity, feet per second per second.
$Q_p$ = pump delivery rate, pounds per hour of fluid supplied to the valve assembly at inlet 12.
$A_o$ = orifice area, square inches.
$A_n$ = nozzle area, square inches, i.e., the area of outlets 13–17 in FIGURE 2.
$A_t$ = valve throat area, square inches, where the throat is in the angle between the vertical axis of the control valve defining the throat 24.
$D$ = valve ball diameter, inches.
$\theta$ = valve throat angle, degrees, where the throat angle is the angle between the vertical axis of the control valve and the wall 24 of the throat.
$F$ = force on valve ball, pounds.
$B$ = flux density, Webers per square meters.
$N$ = number of turns of wire on solenoid.
$I$ = electric current in coil, amperes.
$r_m$ = mean radius of coil, inches.
$L$ = length of coil, inches.
$x$ = distance from seat apex to center of ball, inches.

$$P_o = \frac{\frac{w}{2g}Q_p^2}{\left[\frac{A_o}{\sqrt{\left(\frac{A_o}{A_t}\right)^2 - 1}} + A_n\right]^2} \quad (1)$$

$$A_t = \pi \cos\theta \left(x^2 \sin^2\theta - \frac{D^2}{4}\right) \quad (2)$$

$$F = \left[\frac{\left(\frac{A_o}{A_t}\right)^2 - 2\frac{A_o}{A_t}\cos\theta + 1}{\left(\frac{A_o}{A_t}\right)^2 - 1}\right] P_o A_o \quad (3)$$

$$F = \frac{\pi B N I D^3}{12} \frac{r_m^2}{L}\left[\frac{1}{\{r_m^2 + (0.5L+x)^2\}^{3/2}} - \frac{1}{\{r_m^2 + (0.5L-x)^2\}^{3/2}}\right] \quad (4)$$

Within these dicta of theory and practice, it will be understood that a wide variety of particular embodiments may be made.

The shapes of the inlet and the discharge chambers 21 and 22 and the size thereof may be modified. As an example, these may be hemispherical.

The size and shape of the solenoid shown is presently preferred but the same may be made longer and narrower. Also, it may have fewer turns of wire and employ greater currents as long as the heating effect does not alter the characteristics of the fuel to an undesirable degree. It will be understood that such a modification may be used to heat a fuel, to thereby reduce the viscosity thereof. If heating effects are to be minimized, a larger coil with cooling fins on the surrounding magnetic cylinder may be employed.

The exact nature of the material of sphere 1 is not critical so long as it is paramagnetic. The magnetic type of stainless steel is presently employed. The diameter of the ball may be chosen within the limits dictated by the mathematical expressions given above. In practice, desirable diameters have been from roughly one-eighth to one-third of an inch.

Still other modifications may be made in the arrangement, proportions, shapes and details of the embodiments without departing from the scope of the present invention.

What is claimed is:

1. A fluid control system, comprising:
   (a) a body having a fluid passage therethrough;
   (b) said fluid passage defining a longitudinally extending flared throat, the diameter of said throat increasing from one end thereof to the other end thereof;
   (c) said fluid passage defining an inlet orifice extending from said one end of said throat;
   (d) a magnetically attractable sphere freely disposed and longitudinally movable within said throat to define an annular throat passage between said sphere and the wall of said throat;
   (e) means for exerting a magnetic force on said sphere toward said inlet orifice in opposition to the force exerted on said sphere by fluid flowing through said fluid passage;
   (f) the arrangement being such that the magnetic force acts directly on said sphere;
   (g) a chamber, a fluid inlet, a fluid outlet having a fluid outlet line connected thereto, said inlet, outlet and fluid passage communicating with said chamber; and
   (h) means for sensing the pressure of fluid in said fluid outlet line and for supplying a signal proportional to said outlet pressure to said magnetic force exerting means to thereby maintain said fluid outlet pressure substantially constant upon fluctuation of pressure delivered to said chamber through said fluid inlet.

2. The fluid system of claim 1, said throat being frusto-conical.

3. The fluid system of claim 1, the diameter of said throat increasing more rapidly with longitudinal distance at said one end thereof than at said other end thereof.

4. The fluid system of claim 1, the diameter of said throat increasing less rapidly with longitudinal distance at said one end thereof than at said other end thereof.

(References on following page)

References Cited by the Examiner

UNITED STATES PATENTS

| | | | |
|---|---|---|---|
| 850,738 | 4/1907 | Dempster | 251—139 X |
| 2,669,247 | 2/1954 | Olah | 137—84 |
| 2,844,157 | 7/1958 | Griffith | 137—82 |

FOREIGN PATENTS 1,001,073  2/1954  Germany.

ISADOR WEIL, *Primary Examiner.*

WILLIAM F. O'DEA, *Examiner.*